(12) United States Patent
Tamagawa

(10) Patent No.: US 7,298,403 B2
(45) Date of Patent: Nov. 20, 2007

(54) IMAGE READING DEVICE

(75) Inventor: Toshimitsu Tamagawa, Kyoto (JP)

(73) Assignee: Rohm Co., Ltd., Kyoto (JP)

( * ) Notice: Subject to any disclaimer, the term of this patent is extended or adjusted under 35 U.S.C. 154(b) by 868 days.

(21) Appl. No.: 10/001,791

(22) Filed: Dec. 5, 2001

(65) Prior Publication Data
US 2003/0103152 A1 Jun. 5, 2003

(51) Int. Cl.
H04N 9/64 (2006.01)
H04N 3/14 (2006.01)
H04N 5/335 (2006.01)
H04N 1/04 (2006.01)

(52) U.S. Cl. .................. 348/245; 348/308; 358/482
(58) Field of Classification Search ............ 348/230.1, 348/243, 245, 283, 294, 298, 300, 302–304, 348/307–311, 317, 321; 250/208.1, 214 A; 358/482–483; 382/321; 710/36; 378/98.8; 330/308
See application file for complete search history.

(56) References Cited

U.S. PATENT DOCUMENTS

| | | | | | |
|---|---|---|---|---|---|
| 4,453,187 | A | * | 6/1984 | Komiya et al. | 348/309 |
| 4,573,079 | A | * | 2/1986 | Yamaguchi | 348/310 |
| 4,617,471 | A | * | 10/1986 | Suzuki et al. | 358/482 |
| 4,646,155 | A | * | 2/1987 | Miyazawa et al. | 358/471 |
| 4,661,860 | A | * | 4/1987 | Miyazawa | 348/241 |
| 4,691,114 | A | * | 9/1987 | Hasegawa et al. | 358/482 |
| 4,797,560 | A | * | 1/1989 | Berger et al. | 348/309 |
| 5,268,765 | A | * | 12/1993 | Yamashita | 348/245 |
| 5,363,216 | A | * | 11/1994 | Kim | 358/482 |
| 5,452,001 | A | * | 9/1995 | Hosier et al. | 348/230.1 |
| 5,592,222 | A | * | 1/1997 | Nakamura et al. | 348/300 |
| 5,633,679 | A | * | 5/1997 | Hosier et al. | 348/243 |
| 5,654,755 | A | * | 8/1997 | Hosier | 348/245 |
| 5,717,459 | A | * | 2/1998 | Maki et al. | 348/312 |
| 5,724,094 | A | * | 3/1998 | Tseng et al. | 348/243 |
| 5,742,659 | A | * | 4/1998 | Atac et al. | 379/98.8 |
| 5,784,178 | A | * | 7/1998 | Tsai et al. | 358/482 |
| 5,801,850 | A | * | 9/1998 | Maki et al. | 358/483 |
| 5,867,212 | A | * | 2/1999 | Toma et al. | 348/311 |
| 5,969,759 | A | * | 10/1999 | Morimoto | 348/311 |
| 6,002,287 | A | * | 12/1999 | Ueno et al. | 327/307 |
| 6,130,712 | A | * | 10/2000 | Miyazaki et al. | 348/243 |
| 6,344,877 | B1 | * | 2/2002 | Gowda et al. | 348/245 |
| 6,445,413 | B1 | * | 9/2002 | Hosier et al. | 348/245 |
| 6,452,151 | B1 | * | 9/2002 | Tamagawa | 250/208.1 |
| 6,476,867 | B1 | * | 11/2002 | Kobayashi et al. | 348/307 |
| 6,553,437 | B1 | * | 4/2003 | Aswell et al. | 710/36 |
| 6,606,172 | B1 | * | 8/2003 | Moro | 358/483 |
| 6,750,912 | B1 | * | 6/2004 | Tennant et al. | 348/300 |

(Continued)

FOREIGN PATENT DOCUMENTS

JP    2001024947 A  *  1/2001

(Continued)

Primary Examiner—John M. Villecco
(74) Attorney, Agent, or Firm—Arent Fox LLP

(57) ABSTRACT

An image reading device ready to operate at higher speed is built as an IC chip having a plurality of processing sections, of which each has a plurality of image reading photoelectric conversion elements, a plurality of transistors for reading a photoelectric conversion signal from the image reading photoelectric conversion elements, a signal selection circuit for sequentially selecting the plurality of transistors, and a signal output line by way of which the photoelectric conversion signal is transmitted.

5 Claims, 4 Drawing Sheets

U.S. PATENT DOCUMENTS

| | | |
|---|---|---|
| 6,798,453 B1 * | 9/2004 | Kaifu ........................ 348/304 |
| 6,853,402 B2 * | 2/2005 | Hosier et al. ............... 348/241 |
| 6,950,132 B1 * | 9/2005 | Kozuka ...................... 348/243 |
| 7,045,758 B2 * | 5/2006 | Zarnowski et al. ......... 348/300 |
| 7,095,004 B2 * | 8/2006 | Tsou et al. ............. 250/214 A |
| 7,167,284 B2 * | 1/2007 | Sawada ...................... 358/483 |
| 2002/0044210 A1 * | 4/2002 | Tamagawa .................. 348/294 |
| 2002/0044699 A1 * | 4/2002 | Kozuka ...................... 382/312 |
| 2003/0123106 A1 * | 7/2003 | Sawada ...................... 358/483 |
| 2004/0245434 A1 * | 12/2004 | Yokomichi ............... 250/208.1 |
| 2007/0058058 A1 * | 3/2007 | Lee ............................ 348/294 |
| 2007/0145244 A1 * | 6/2007 | Yokomichi ............. 250/214 A |

FOREIGN PATENT DOCUMENTS

| | | | |
|---|---|---|---|
| JP | 2001156989 A | * | 6/2001 |
| JP | 2002101261 A | * | 4/2002 |

\* cited by examiner

US 7,298,403 B2

IMAGE READING DEVICE

BACKGROUND OF THE INVENTION

1. Field of the Invention

The present invention relates to an image reading device, such as an image sensor, that converts optical information to an electric signal.

2. Description of the Prior Art

As FIG. 3 shows, an image reading device is composed of IC chips $K_1, K_2, \ldots, K_m$, for reading an image, arranged in a row and mounted on a printed circuit board (not shown). The IC chips $K_1, K_2, \ldots, K_m$ sequentially output photoelectric conversion signals, which are then converted by an A/D converter 100 into a digital signal, which is then fed out via an output terminal 200. The IC chips $K_1, K_2, \ldots, K_m$ all have the same circuit configuration, of which a conventional example will be described below with reference to FIG. 4.

Photodiodes $PD_1, PD_2, \ldots, PD_n$, serving as photoelectric conversion elements, have their anodes connected to ground, and have their cathodes connected respectively to the gates of p-channel MOSFETs (metal-oxide semiconductor field-effect transistors) $A_1, A_2, \ldots, A_n$ for amplification. The transistors $A_1, A_2, \ldots, A_n$ receive, at their sources, constant currents respectively from constant-current sources $I_1, I_2, \ldots, I_n$, and have their drains connected to ground.

A bias voltage supply circuit 2 outputs a positive direct-current voltage stably. The voltage (hereinafter referred to as the "bias voltage") output from the bias voltage supply circuit 2 is applied, through the drain-source channels of p-channel MOSFETs $B_1, B_2, \ldots B_n$ for switching, to the cathodes of the photodiodes $PD_1, PD_2, \ldots, PD_n$ respectively.

In this circuit configuration, when the transistor $B_x(x=1, 2, \ldots, n)$ remains on for a predetermined time or longer, a reverse bias is applied to the photodiode $PD_x$, and thus a predetermined amount of electric charge is accumulated therein. In the following descriptions, this will be depicted as "the photodiode $PD_x$ being initialized."

When the transistor $B_x$ turns from on to off, the initialization of the photodiode $PD_x$ is broken off, and the accumulated electric charge is discharged in proportion to the amount of incident light, causing a current to flow. Thus, the photodiode $PD_x$ gives a voltage proportional to the amount of incident light.

Moreover, a transistor $C_x$ turns on, with the result that the voltage signal (hereinafter referred to simply as "the signal of the photodiode $PD_x$") at the cathode of the photodiode $PD_x$ is amplified by a source-follower circuit formed by the transistor $A_x$, is then subjected to further amplification, waveform shaping, and other processing by an output circuit 51, and is then fed out via a terminal $T_{OUT}$ (hereinafter, this will be depicted as "the signal of the photodiode $PD_x$ being read out").

A control circuit 52 controls the transistors $C_x$ in such a way that the signals of the photodiodes $PD_1, PD_2, \ldots, PD_n$ are output sequentially, and also controls the transistors Bx in such a way that the photodiode $PD_x$ is initialized every time the signal of this photodiode $PD_1$ is read out.

However, in this conventional circuit configuration, the signals of all the photodiodes $PD_1, PD_2, \ldots, PD_n$ are transmitted to the output circuit 51 by way of a single output line L, which is thus provided so as to be common to as many as several tens to several hundred photodiodes. This makes the output line L considerably long, and thus imposes a limit on the operating frequency of the image reading device, because, the longer the conductor laid as the output line L, the higher its resistance and capacitance, and thus the greater the resulting time constant.

Moreover, in the conventional circuit configuration, there are variations in the characteristics of the individual photodiodes $PD_1, PD_2, \ldots, PD_n$, but nevertheless the signals read out from them are fed out intact. As a result, according to the position of the photodiodes within the IC chip, for example, the characteristics of the semiconductors, such as their degree of impurity and thickness, and the light shield conditions for the individual photodiodes vary, and thus the signals that these photodiodes output vary.

SUMMARY OF THE INVENTION

An object of the present invention is to provide an image reading device that is ready to operate at a higher operating frequency.

To achieve the above object, according to the present invention, an image reading device is built as an IC chip having a plurality of processing sections, of which each has a plurality of image reading photoelectric conversion elements, a plurality of transistors for reading a photoelectric conversion signal from the image reading photoelectric conversion elements, a signal selection circuit for sequentially selecting the plurality of transistors, and a signal output line by way of which the photoelectric conversion signal is transmitted.

This arrangement helps shorten the signal output line within each processing section. As a result, it is possible to reduce the resistance and capacitance of the conductor laid as the signal output line. Moreover, it is possible to reduce the number of transistors that are connected to a single signal output line and thereby reduce the parasitic capacitance connected to a single signal output line. This makes it possible to increase the operation speed.

BRIEF DESCRIPTION OF THE DRAWINGS

This and other objects and features of the present invention will become clear from the following description, taken in conjunction with the preferred embodiments with reference to the accompanying drawings in which.

DESCRIPTION OF THE PREFERRED EMBODIMENTS

Figure 1:
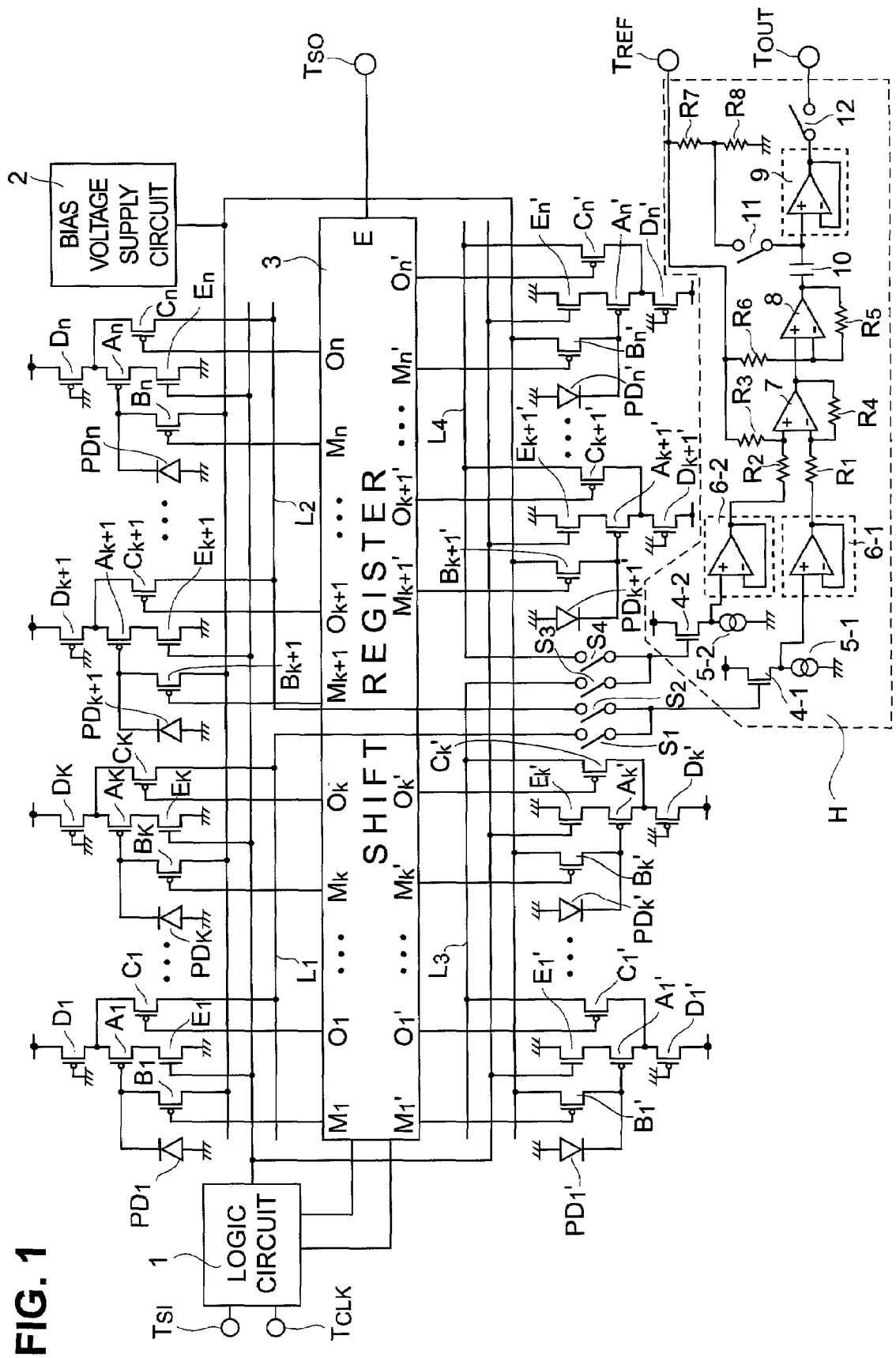
FIG. 1 is a diagram showing the circuit configuration of each of the IC chips constituting an image reading device embodying the invention.

Hereinafter, an embodiment of the present invention will be described with reference to the drawings. First, the circuit configuration of each of the IC chips constituting an image reading device embodying the invention will be described with reference to FIG. 1.

Photodiodes $PD_1, \ldots, PD_n, PD_1', \ldots, PD_n'$, serving as photoelectric conversion elements, have their anodes connected to ground, and have their cathodes connected respectively to the gates of p-channel MOSFETs $A_1, \ldots, A_n$, $A_1', \ldots, A_n'$ for amplification.

Here, the photodiodes $PD_1', \ldots, PD_n'$ are shielded from light so as not to be involved in image reading. In the following descriptions, these photodiodes will be referred to also as the "dummy photodiodes." On the other hand, the photodiodes $PD_1, \ldots, PD_n$ are not shielded from light, and are used in image reading. In the following descriptions, these photodiodes will be referred to also as the "image reading photodiodes."

The transistors $A_1, \ldots, A_n, A_1', \ldots, A_n'$ have their sources connected, through the drain-source channels of p-channel MOSFETs $D_1, \ldots, D_n, D_1', \ldots, D_n'$ respectively, to a supply voltage. The transistors $D_1, \ldots, D_n, D_1', \ldots, D_n'$ have their gates connected to ground, and the transistors $A_1, \ldots, A_n$, $A_1', \ldots, A_n'$ receive constant currents at their sources.

The transistors $A_1, \ldots, A_n, A_1', \ldots, A_n'$ have their drains connected, through the drain-source channels of n-channel MOSFETs $E_1, \ldots, E_n, E_1', \ldots, E_n'$ respectively, to ground. A logic circuit 1 controls the transistors $E_1, \ldots, E_n$, $E_1', \ldots, E_n'$ in such a way that they remain on only from immediately before the start of the reading of the signal from the first image reading photodiode $PD_1$ until the completion of the reading of the signal from the last image reading photodiode $PD_n$. This helps reduce electric power consumption.

A bias voltage (i.e. a stable direct-current voltage output from a bias voltage supply circuit 2) is applied, through the drain-source channels of p-channel MOSFETs $B_1, \ldots, B_n$, $B_1', \ldots, B_n'$ for switching, to the cathodes of the photodiodes $PD_1, \ldots, PD_n, PD_1', \ldots, PD_n'$ respectively. The transistors $B_1, \ldots, B_n, B_1', \ldots, B_n'$ respectively receive, at their gates, signals output from terminals $M_1, \ldots, M_n$, $M_1', \ldots, M_n'$ of a shift register 3.

The transistors $A_1, \ldots, A_k$ have their sources connected, respectively through the drain-source channels of p-channel MOSFETs $C_1, \ldots, C_k$ for switching, together to a first output line L1. The transistors $A_{k+1}, \ldots, A_n$ have their sources connected, respectively through the drain-source channels of p-channel MOSFETs $C_{k+1}, \ldots, C_n$ for switching, together to a second output line L2. The first and second output lines L1 and L2 are connected, respectively through a first and a second output line switching switch S1 and S2, together to the gate of an n-channel MOSFET 4-1.

The transistors $A_1', \ldots, A_k'$ have their sources connected, respectively through the drain-source channels of p-channel MOSFETs $C_1', \ldots, C_k'$ for switching, together to a third output line L3. The transistors $A_{k+1}', \ldots, A_n'$ have their sources connected, respectively through the drain-source channels of p-channel MOSFETs $C_{k+1}', \ldots, C_n'$ for switching, together to a fourth output line L4. The third and fourth output lines L3 and L4 are connected, respectively through a third and a fourth output line switching switch S3 and S4, together to the gate of an n-channel MOSFET 4-2.

The first, second, third, and fourth output line switching switches S1, S2, S3, and S4 are each composed of, for example, a p-channel MOSFET, and their on/off states are controlled by the logic circuit 1 in the manner described later.

The transistors $C_1, \ldots, C_n, C_1', \ldots, C_n'$ respectively receive, at their gates, signals output from terminals $O_1, \ldots, O_n, O_1', \ldots, O_n'$ of the shift register 3. The sources of the transistors 4-1 and 4-2 are connected, through constant current sources 5-1 and 5-2 respectively, to ground. The drains of the transistors 4-1 and 4-2 are connected to the supply voltage.

Buffer amplifiers 6-1 and 6-2 are each composed of an operational amplifier having its output fed back to its own inverting input terminal (−). The input sides of the buffer amplifiers 6-1 and 6-2 (i.e. the non-inverting input terminal (+) of each operational amplifier) are connected to the sources of the transistors 4-1 and 4-2 respectively.

That is, the signals of the image reading photodiodes $PD_x$ (x=1, 2, ..., n) are fed, through the source follower circuits formed by the transistors $A_x$ respectively, and then through the source follower circuit formed by the transistor 4-1, to the buffer amplifier 6-1. On the other hand, the signals of the dummy photodiodes $PD_x'$ are fed, through the source follower circuits formed by the transistors $A_x'$ respectively, and then through the source follower circuit formed by the transistor 4-2, to the buffer amplifier 6-2.

The output side (the output terminal of the operational amplifier) of the buffer amplifier 6-1 is connected through a resistor $R_1$ to the inverting input terminal (−) of an operational amplifier 7. The output side of the buffer amplifier 6-2 is connected through a resistor $R_2$ to the non-inverting input terminal (+) of the operational amplifier 7.

To the non-inverting input terminal (+) of the operational amplifier 7, a direct-current reference voltage is fed from outside the IC chip via a terminal $T_{REF}$ thereof through a resistor $R_3$. The output terminal of the operational amplifier 7 is connected through a resistor $R_4$ to its own inverting input terminal (−), and also to the non-inverting input terminal (+) of an operational amplifier 8.

To the inverting input terminal (−) of the operational amplifier 8, its own output terminal is connected through a resistor $R_5$, and also the reference voltage fed from outside via the terminal $T_{REF}$ is applied through a resistor $R_6$.

A buffer amplifier 9 is composed of an operational amplifier with its output fed back to its own inverting input terminal (−). To the input side of the buffer amplifier 9, the output terminal of the operational amplifier 8 is connected through a capacitor 10. Moreover, the input side of the buffer amplifier 9 is connected through a switch 11 to the node between resistors $R_7$ and $R_8$ that are connected in series between the terminal $T_{REF}$, to which the reference voltage is applied from outside, and ground.

The switch 11 is composed of, for example, an analog switch, and is controlled by the logic circuit 1 in such a way as to remain on only for a predetermined time before the start of the reading of the first image reading photodiode $PD_1$.

The output of the buffer amplifier 9 is fed out through a switch 12 via a terminal $T_{OUT}$ of the IC chip. The switch 12 is composed of, for example, an analog switch, and is controlled by the logic circuit 1 in such a way as to remain on only from immediately before the start of the reading of the signal from the first image reading photodiode $PD_1$ until the completion of the reading of the signal from the last image reading photodiode $PD_n$.

The logic circuit 1 receives a clock signal CLK fed in from outside via a terminal $T_{CLK}$ of the IC chip and a start trigger signal ST fed in from outside via a terminal $T_{ST}$ of the IC chip. The clock signal CLK fed to the individual IC chips are common to all of them. On the basis of the clock signal CLK and the start trigger signal ST fed thereto, the logic circuit 1 controls the transistors $E_x$ and the switches 11 and 12 in the manner described above.

Moreover, before the start of the reading of the signal from the first image reading photodiode $PD_1$, i.e. before time point $t_3$ shown in FIG. 2 described later, the logic circuit 1 turns on the first output line switching switch S1, turns off the second output line switching switch S2, turns on the third output line switching switch S3, and turns off the fourth output line switching switch S4. Furthermore, in the last half of the period in which the signal from the photodiode $PD_k$ is read, i.e. between time points $t_{2k+2}$ and $t_{2k+3}$ shown in FIG. 2 described later, the logic circuit 1 turns off the first output line switching switch S1, turns on the second output line switching switch S2, turns off the third output line switching switch S3, and turns on the fourth output line switching switch S4.

The start trigger signal ST, fed in via the terminal $T_{SI}$ of the IC chip, and the clock signal CLK, fed in via the terminal $T_{CLK}$ of the IC chip, are also fed through the logic circuit 1 to the shift register 3. As FIG. 2 shows, the shift register 3 sequentially outputs, in synchronism with the second and following trailing edges of the clock signal CLK after the rising edge of the start trigger signal ST, negative pulses, each having a pulse width equal to one period of the clock signal CLK, via its terminals $O_1$, $O_2$, ..., $O_n$. The shift register 3 outputs the same signals as it outputs via its terminals $O_1$, $O_1$, ..., $O_n$ also via its terminals $O_1'$, $O_2'$, ..., $O_n'$.

As a result, the transistors $C_1$ and $C_1'$, the transistors $C_2$ and $C_2'$, ..., the transistors $C_n$ and $C_n'$ are sequentially kept on for one period of the clock signal CLK one pair after another, specifically in such a way that the transistors $C_1$ and $C_1'$ remain on between time points $t_3$ and $t_5$, the transistors $C_2$ and $C_2'$ remain on between time points $t_5$ and $t_7$, and so forth. Thus, the signals of the image reading photodiodes $PD_1$, $PD_2$, ..., $PD_n$ are sequentially fed to the gate of the transistor 4-1, and the signals of the dummy photodiodes $PD_1'$, $PD_2'$, ..., $PD_n'$ are sequentially fed to the gate of the transistor 4-2.

Figure 2:
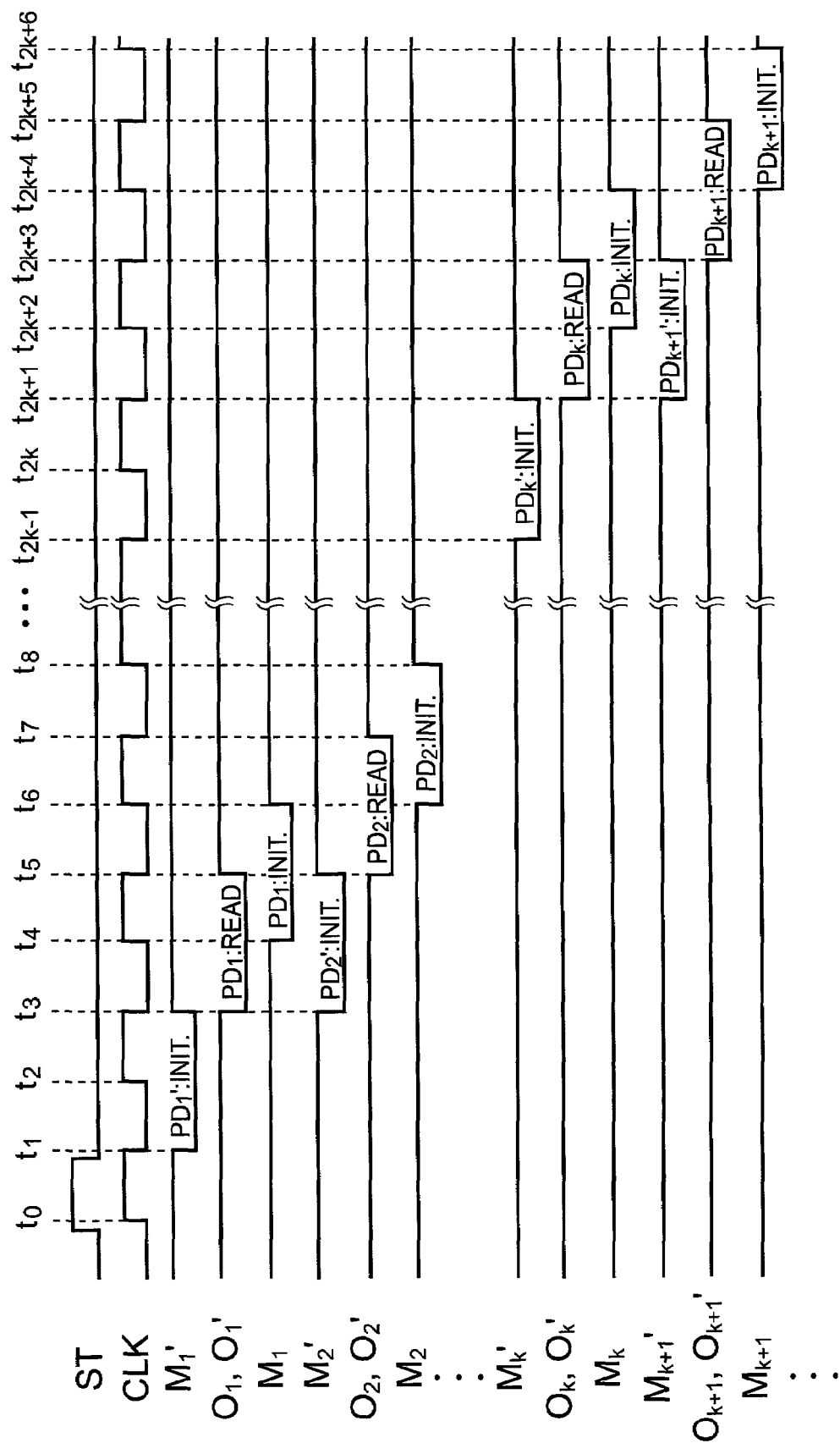
FIG. 2 is a timing chart of the relevant signals in each of the IC chips constituting the image reading device embodying the invention.
Figure 3:
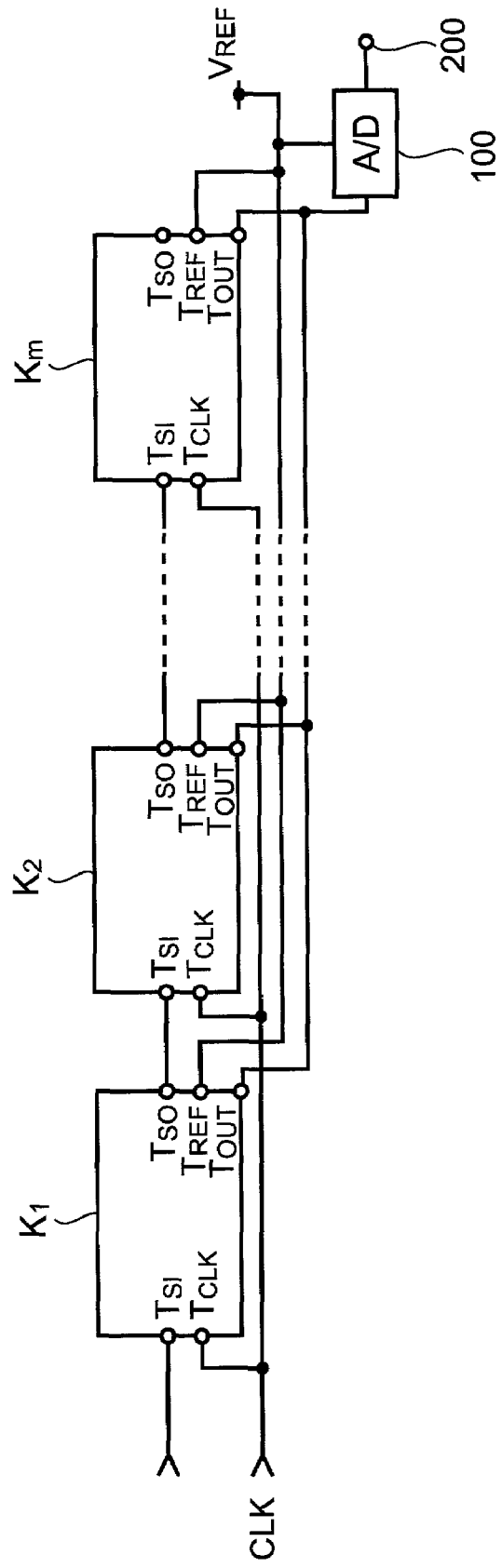
FIG. 3 is a diagram showing an outline of the circuit configuration of an image reading device.
Figure 4:
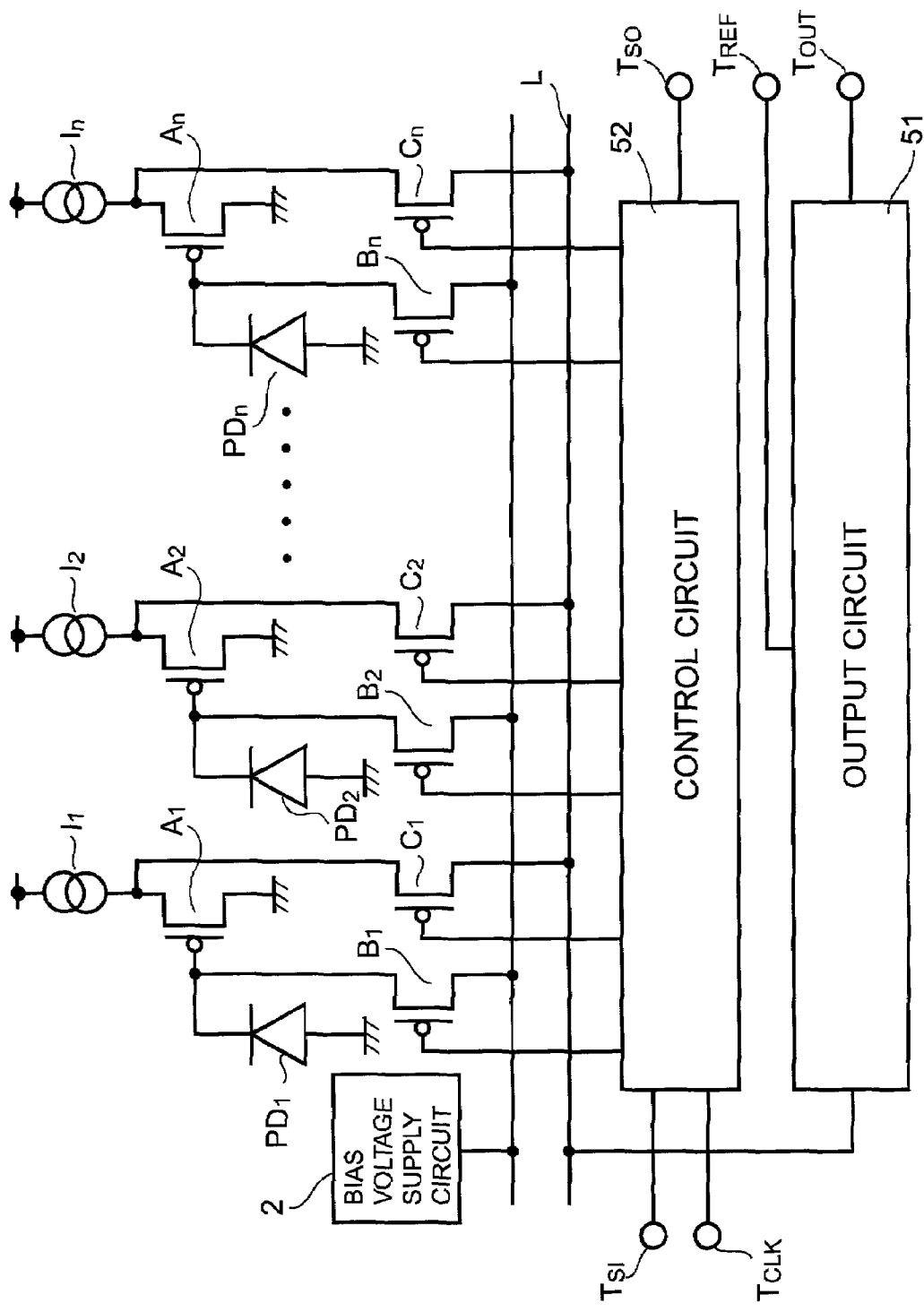
FIG. 4 is a diagram showing the circuit configuration of each of the IC chips constituting a conventional image reading device.

Moreover, as FIG. 2 shows, the shift register 3 also sequentially outputs, in synchronism with the third and following rising edges of the clock signal CLK after the rising edge of the start trigger signal ST, negative pulses, each having a pulse width equal to one period of the clock signal CLK, via its terminals $M_1$, $M_2$, ..., $M_n$.

As a result, the transistors $B_1$, $B_2$, ..., $B_n$ are sequentially kept on for one period of the clock signal CLK one after another, specifically in such a way that the transistor $B_1$ remains on between time points $t_4$ and $t_6$, the transistor $B_2$ remains on between time points $t_6$ and $t_8$, and so forth. Thus, the image reading photodiodes $PD_1$, $PD_2$, ..., $PD_n$ are initialized sequentially.

In this way, if one pays attention to the first image reading photodiode $PD_1$, whereas the transistor $C_1$ is kept on between time points $t_3$ and $t_5$ so that the signal of the photodiode $PD_1$ is read out, the transistor $B_1$ is also kept on between time points $t_4$ and $t_5$ (i.e. during the last half of the read period) so that the photodiode $PD_1$ is initialized. Thus, only the signal read out between time points $t_3$ and $t_4$ (i.e. during the first half of the read period) is actually used. Likewise, also with the other image reading photodiodes $PD_2$, $PD_3$, ..., $PD_n$, only the signals read out during the first half of their respective read period are actually used.

Moreover, as FIG. 2 shows, the shift register 3 also sequentially outputs, in synchronism with the trailing edges of the clock signal CLK after the rising edge of the start trigger signal ST, negative pulses, each having a pulse width equal to one period of the clock signal CLK, via its terminals $M_1'$, $M_2'$, ..., $M_n'$.

As a result, the transistors $B_1'$, $B_2'$, ..., $B_n'$ are sequentially kept on for one period of the clock signal CLK one after another, specifically in such a way that the transistor $B_1'$ remains on between time points $t_1$ and $t_3$, the transistor $B_2'$ remains on between time points $t_3$ and $t_5$, and so forth. Thus, the dummy photodiodes $PD_1'$, $PD_2'$, ..., $PD_n'$ are initialized sequentially.

Moreover, the shift register 3 outputs, at its terminal E, a signal, which is fed out of the IC chip via its terminal $T_{SO}$ so as to be fed to the terminal $T_{SI}$ of the next IC chip. That is, this signal is used as the start trigger signal ST in the next IC chip. Here, the shift register 3 outputs one positive pulse via its terminal E with such appropriate timing as to prevent interference between the reading of the signal of the last image reading photodiode $PD_n$ of the IC chip under discussion and the reading of the signal of the first image reading photodiode $PD_1$ of the next IC chip.

In this circuit configuration, the differences between the signals of the image reading photodiodes $PD_x$ and the signals of the corresponding dummy photodiodes $PD_x'$ are output. Thus, even if there are variations among the output signals from the individual photodiodes within an IC chip according to their position, for example, due to variations in the characteristics of the semiconductors, such as their degree of impurity and thickness, and variations in the light shield conditions of the individual photodiodes, such variations are cancelled. This helps enhance the uniformity of the signal levels obtained.

Moreover, instead of transmitting all the signals from the individual image reading photodiodes $PD_1$, ..., $PD_n$ to the output circuit H by way of a single output line, the signals from the group of the image reading photodiode $PD_1$, ..., $PD_k$ are transmitted by way of the first output line L1, and the signals from the group of the image reading photodiode $PD_{k+1}$, ..., $PD_n$ are transmitted by way of the first output line L2. Likewise, instead of transmitting all the signals from the dummy photodiodes $PD_1'$, ..., $PD_n'$ to the output circuit H by way of a single output line, the signals from the group of the dummy photodiode $PD_1'$, ..., $PD_k'$ are transmitted by way of the third output line L3, and the signals from the group of the dummy photodiode $PD_{k+1}'$, ..., $PD_n'$ are transmitted by way of the fourth output line L4. This makes it possible to shorten the output line substantially in half. Shortening the conductor laid as the output line results in reducing its resistance and capacitance, and also in reducing the parasitic capacitance due to the transistors connected thereto in half. This reduces the resulting time constant, and thus makes it possible to increase the operating frequency of the image reading device. Specifically, whereas the operating frequency conventionally achieved is limited to 1.5 to 2.0 MHz, that achieved in this embodiment is as high as 3.0 to 4.0 MHz.

Where, as in the embodiment described above, the image reading photodiodes are divided into two groups, they are classified, for example, according to whether the signals from them are read out in the first half or latter half of the period for reading one complete image. The image reading photodiodes may be divided into a plurality of groups, i.e. not only two but also three or more; in any case, output lines are provided one for each group.

It is possible to omit the dummy photodiodes completely, or provide only one dummy photodiode common to all the image reading photodiodes and output the differences between the signals of the individual image reading photodiodes and the signal of the dummy photodiode. This helps simplify the circuit configuration, and thus contributes to miniaturization and cost reduction.

Providing as many dummy photodiodes as image reading photodiodes, however, makes it possible to arrange the dummy photodiodes close to the corresponding image reading photodiodes. Thus, in this arrangement, outputting the differences between the signals of the image reading photodiodes and the signals of the dummy photodiodes arranged close thereto makes it possible to reduce variations among the output signals from the individual photodiodes within an IC chip according to their position, for example, due to variations in the characteristics of the semiconductors, such as their degree of impurity and thickness, and variations in the light shield conditions of the individual photodiodes.

As described above, according to the present invention, in an image reading device, it is possible to shorten the output line by way of which signals obtained from photoelectric conversion elements are transmitted to an output circuit, and also reduce the number of transistors connected to one output line. That is, it is possible to reduce the resistance and capacitance of the conductor laid as the output line. This reduces the parasitic capacitance due to the transistors connected to the output line, and thereby reduces the resulting time constant. In this way, it is possible to increase the operating frequency of the image reading device and obtain outputs corrected for variations in the characteristics of photodiodes.

What is claimed is:

1. An IC chip for reading an image, comprising:
   a plurality of image reading photoelectric conversion elements divided into a plurality of groups;
   a read selection circuit for sequentially selecting the plurality of image reading photoelectric conversion elements and reading a photoelectric conversion signal from the selected image reading photoelectric conversion element;
   a plurality of signal output lines by way of which the photoelectric conversion signal is transmitted, each of the plurality of signal output lines being independently provided from each other and corresponding to each of the plurality of groups;
   an output circuit;
   a signal output line switching circuit connected between the plurality of signal output lines and the output circuit for sequentially selecting among the plurality of signal output lines to lead the photoelectric conversion signal transmitted through the selected signal output line to the output circuit;
   a logic circuit for controlling the signal output line switching circuit to switch from a signal output line currently selected to a signal output line corresponding to the next group after a last photoelectric conversion signal in the currently selected group has been read but before a first photoelectric conversion signal in the next group is read; and
   an initialization selection circuit for sequentially selecting the plurality of image reading photoelectric conversion elements and initializing the selected image reading photoelectric conversion element,
   wherein the read selection circuit reads the photoelectric conversion signal from the selected image reading photoelectric conversion element during one period of a clock signal, and
   wherein the initialization selection circuit initializes the selected image reading photoelectric conversion element during a last half of said one period and during a first half of a next period of the clock signal.

2. An IC chip for reading an image, comprising:
   a plurality of image reading photoelectric conversion elements divided into a plurality of first groups;
   a first read selection circuit for sequentially selecting the plurality of image reading photoelectric conversion elements and reading a first photoelectric conversion signal from the selected image reading photoelectric conversion element;
   a plurality of first signal output lines by way of which the first photoelectric conversion signal is transmitted from the plurality of image reading photoelectric conversion elements, each of the plurality of first signal output lines being independently provided from each other and corresponding to each of the plurality of first groups;
   a plurality of dummy photoelectric conversion elements divided into a plurality of second groups, each of the plurality of dummy photoelectric conversion elements shielded from light and forming an exclusive pair with one of the plurality of image reading photoelectric conversion elements by being arranged in close proximity thereto;
   a second read selection circuit for sequentially selecting the plurality of dummy photoelectric conversion elements and reading a second photoelectric conversion signal from the selected dummy photoelectric conversion element;
   a plurality of second signal output lines by way of which the second photoelectric conversion signal is transmitted from the plurality of dummy photoelectric conversion elements, each of the plurality of second signal output lines being independently provided from each other and corresponding to each of the plurality of second groups;
   an output circuit;
   a signal output line switching circuit connected between the plurality of first signal output lines and the output circuit for sequentially selecting among the plurality of first signal output lines to lead the first photoelectric conversion signal transmitted through the selected first signal output line to the output circuit and also connected between the plurality of second signal output lines and the output circuit for sequentially selecting among the plurality of second signal output lines to lead the second photoelectric conversion signal transmitted through the selected second signal output line to the output circuit; and
   a logic circuit for controlling the signal output line switching circuit to switch from a first signal output line currently selected to a first signal output line corresponding to the first group subsequently selected and from a second signal output line currently selected to a second signal output line corresponding to the second group subsequently selected, after a last image reading photoelectric conversion element in a first group currently selected and a last dummy photoelectric conversion element in a second group currently selected have been read but before a first image reading photoelectric conversion element in a first group subsequently selected and a first dummy photoelectric conversion element in a second group subsequently selected are read.

3. An IC chip for reading an image as claimed in claim 2, further comprising:
   a first initialization selection circuit for sequentially selecting the plurality of image reading photoelectric conversion elements and initializing the selected image reading photoelectric conversion element; and
   a second initialization selection circuit for sequentially selecting the plurality of dummy photoelectric conversion elements and initializing the selected dummy photoelectric conversion element, wherein the first read selection circuit reads the first photoelectric conversion signal from the selected image reading photoelectric conversion element during one period of a clock signal, and the first initialization selection circuit initializes the selected image reading photoelectric conversion element during a last half of said one period and during a first half of a next period of the clock signal, and wherein the second read selection circuit reads the second photoelectric conversion signal from a dummy photoelectric conversion element that forms a pair with the selected image reading photoelectric conversion element during said one period, and the second initialization selection circuit initializes the dummy photoelectric conversion element that forms a pair with the selected image reading photoelectric conversion element during a full period prior to said one period of the clock signal.

4. An image reading device comprising:
one or more IC chips for reading an image, each comprising:
  a plurality of image reading photoelectric conversion elements divided into a plurality of groups;
  a read selection circuit for sequentially selecting the plurality of image reading photoelectric conversion elements and reading a photoelectric conversion signal from the selected image reading photoelectric conversion element;
  a plurality of signal output lines by way of which the photoelectric conversion signal is transmitted, each of the plurality of signal output lines being independently provided from each other and corresponding to each of the plurality of groups;
  an output circuit;
  a signal output line switching circuit connected between the plurality of signal output lines and the output circuit for sequentially selecting among the plurality of signal output lines to lead the photoelectric conversion signal transmitted through the selected output line to the output circuit;
  a clock input terminal by way of which a clock signal is fed in;
  a start trigger signal input terminal by way of which a start trigger signal for sequentially scanning an image being read is fed in from an IC chip for reading an image in a previous stage;
    a start trigger signal output terminal by way of which a start trigger signal for sequentially scanning the image being read is fed out to an IC chip for reading an image in a following stage;
  a logic circuit for controlling the signal output line switching circuit to switch from a signal output line currently selected to a signal output line corresponding to a next group after a last photoelectric conversion signal in the currently selected group has been read but before a first photoelectric conversion signal in the next group is read; and
  an initialization selection circuit for sequentially selecting the plurality of image reading photoelectric conversion elements and initializing the selected image reading photoelectric conversion element,
    wherein the read selection circuit reads the photoelectric conversion signal from the selected image reading photoelectric conversion element during one period of a clock signal, and
    wherein the initialization selection circuit initializes the selected image reading photoelectric conversion element during a last half of said one period and during a first half of a next period of the clock signal,
  wherein the image reading device further comprises an A/D converter for converting a signal output from the output circuit of said one or more IC chips into a digital signal.

5. An image reading device comprising:
one or more IC chips for reading an image, each comprising:
  a plurality of image reading photoelectric conversion elements divided into a plurality of first groups;
  a first read selection circuit for sequentially selecting the plurality of image reading photoelectric conversion elements and reading a first photoelectric conversion signal from the selected image reading photoelectric conversion element;
  a plurality of first signal output lines by way of which the first photoelectric conversion signal is transmitted from the plurality of image reading photoelectric conversion elements, each of the plurality of first signal output lines being independently provided from each other and corresponding to each of the plurality of first groups;
  a plurality of dummy photoelectric conversion elements divided into a plurality of second groups, each of the plurality of dummy photoelectric conversion elements shielded from light and forming an exclusive pair with one of the plurality of image reading photoelectric conversion elements by being arranged in close proximity thereto;
  a second read selection circuit for sequentially selecting the plurality of dummy photoelectric conversion elements and reading a second photoelectric conversion signal from the selected dummy photoelectric conversion element;
  a plurality of second signal output lines by way of which the second photoelectric conversion signal is transmitted from the plurality of dummy photoelectric conversion elements, each of the plurality of second signal output lines being independently provided from each other and corresponding to each of the plurality of second groups;
  an output circuit;
  a signal output line switching circuit connected between the plurality of first signal output lines and the output circuit for sequentially selecting among the plurality of first signal output lines to lead the first photoelectric conversion signal transmitted through the selected first signal output line to the output circuit and also connected between the plurality of second signal output lines and the output circuit for sequentially selecting among the plurality of second signal output lines to lead the second signal output line to the output circuit; and
  a clock input terminal by way of which a clock signal is fed in;
  a start trigger signal input terminal by way of which a start trigger signal for sequentially scanning an image being read is fed in from an IC chip for reading an image in a previous stage;
  a start trigger signal output terminal by way of which a start trigger signal for sequentially scanning the image being read is fed out to an IC chip for reading an image in a following stage; and
  a logic circuit for controlling the signal output line switching circuit to switch from a first signal output line currently selected to a first signal output line corresponding to the first group subsequently selected and from a second signal output line currently selected to a second signal output line corresponding to the second group subsequently selected, after a last image reading photoelectric conversion element in a first group currently selected and a last dummy photoelectric conversion element in a second group currently selected have been read but before a first image reading photoelectric conversion element in a first group subsequently selected and a first dummy photoelectric conversion element in a second group subsequently selected are read, wherein the image reading device further comprises an A/D converter for converting a signal output from the output circuit of said one or more IC chips into a digital signal.

* * * * *